(12) United States Patent
Torre (10) Patent No.: US 11,589,437 B2
(45) Date of Patent: Feb. 21, 2023

(54) PULSE WIDTH MODULATOR CONTROL CIRCUIT FOR GENERATING A DIMMER CONTROL VOLTAGE SIGNAL

(71) Applicant: Crestron Electronics, Inc., Rockleigh, NJ (US)

(72) Inventor: John Torre, Monroe, NY (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 17/498,990

(22) Filed: Oct. 12, 2021

(65) Prior Publication Data
US 2022/0124887 A1    Apr. 21, 2022

Related U.S. Application Data

(60) Provisional application No. 63/094,385, filed on Oct. 21, 2020.

(51) Int. Cl.
| | | |
|---|---|---|
| *H05B 45/325* | (2020.01) | |
| *H05B 45/3725* | (2020.01) | |
| *H05B 45/10* | (2020.01) | |

(52) U.S. Cl.
CPC .......... *H05B 45/325* (2020.01); *H05B 45/10* (2020.01); *H05B 45/3725* (2020.01)

(58) Field of Classification Search
CPC ... H05B 45/325; H05B 45/10; H05B 45/3725
See application file for complete search history.

(56) References Cited

U.S. PATENT DOCUMENTS

| | | | | |
|---|---|---|---|---|
| 4,683,461 A | * | 7/1987 | Torre | ................. G08B 13/2477 340/572.5 |
| 4,963,880 A | * | 10/1990 | Torre | ....................... H01Q 7/00 343/866 |
| 9,681,514 B1 | | 6/2017 | Kumar | |
| 10,797,593 B1 | * | 10/2020 | Ke | .......................... H02M 3/07 |

* cited by examiner

*Primary Examiner* — Minh D A
(74) *Attorney, Agent, or Firm* — Crestron Electronics, Inc.

(57) ABSTRACT

Provided herein is a lighting load control assembly, comprising: a circuit adapted to source a first lighting load controlling current to a lighting load and sink a second lighting load controlling current from the lighting load through a single common circuit element. Further provided herein is a method for controlling a lighting load, the method comprising: receiving a pulse width modulated (PWM) control signal with a predetermined duty cycle and frequency; generating complementary gate output signals based on the received PWM control signal; generating a pulse train output signal based on the complementary gate output signals with substantially the same duty cycle and frequency as the received PWM control signal; receiving the generated pulse train output signal at an LC filter; and generating an LC output signal that is substantially equal to the time-averaged product of a maximum voltage of the received pulse train output signal and the duty cycle of the received pulse train output signal, which is also substantially equal to the duty cycle of the PWM input signal.

9 Claims, 4 Drawing Sheets

PULSE WIDTH MODULATOR CONTROL CIRCUIT FOR GENERATING A DIMMER CONTROL VOLTAGE SIGNAL

PRIORITY INFORMATION

The present application claims priority under 35 U.S.C. § 119(e) to U.S. Provisional Patent Application Ser. No. 63/094,385, filed Oct. 21, 2020, the entire contents of which are expressly incorporated herein by reference.

BACKGROUND OF THE INVENTION

Technical Field

The embodiments described herein relate generally to load control of a lighting device, and more particular, to systems, methods, and modes for controlling a dimmer of a lighting device using an output of a pulse width modulator (PWM) load controller circuit.

Background Art

It is known to those of skill in the art that linear amplifier circuits are typically used to control dimming functions of lighting circuits. Such linear amplifiers suffer from serious drawbacks that make their use inefficient and, in some cases, impractical. For example, many, if not all such linear amplifier circuits can only sink or source current, but not both. In addition, another known drawback of linear amplifiers that operate as load controllers is the necessity of both positive and negative power supplies, and the attendant inherent power losses associated with the operation of linear amplifiers.

Accordingly, a need has arisen for systems, methods, and modes for controlling a dimmer of a lighting device using an output of a PWM load controller circuit.

SUMMARY

It is an object of the embodiments to substantially solve at least the problems and/or disadvantages discussed above, and to provide at least one or more of the advantages described below.

It is therefore a general aspect of the embodiments to provide systems, methods, and modes for controlling a dimmer of a lighting device using an output of a PWM load controller circuit that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a lighting load control assembly is provided, comprising: a circuit adapted to source a first lighting load controlling current to a lighting load and sink a second lighting load controlling current from the lighting load through a single common circuit element.

According to the first aspect of the embodiments, the single common circuit element comprises: an inductor that is part of a passive low pass inductor capacitor filter.

According to the first aspect of the embodiments, the low-pass inductor capacitor filter is adapted to generate a time-averaged direct current output voltage substantially equal to a product of a maximum voltage of a signal input to the low-pass inductor capacitor filter and a duty cycle of the signal input to the low-pass inductor capacitor filter.

According to the first aspect of the embodiments, the low-pass inductor capacitor filter is further adapted to have a cut-off frequency substantially lower than that is about $1/100$th of a frequency of the signal input to the low-pass inductor capacitor filter.

According to the first aspect of the embodiments, the circuit comprises: a signal receiving device adapted to receive a lighting load controlling signal, the lighting load controlling signal comprising a first fixed frequency and first fixed duty cycle, and wherein the signal receiving device is further adapted to generate a first and second receiving circuit output signal, each of which has substantially similar frequency as the received lighting load controlling signal, but wherein the first and second receiving circuit output signals have complementary duty cycles; a half-bridge circuit adapted to receive the first and second receiving circuit output signals and generate a pulse train output signal, wherein the pulse train output signal comprises a second duty cycle substantially similar to the first fixed duty cycle of the lighting load controlling signal, and wherein the pulse train output signal further comprises a maximum voltage and still further comprises a second frequency substantially similar to the first fixed frequency of the lighting load controlling signal; and an LC filter adapted to receive the pulse train output signal, and generate a direct current output voltage signal with a voltage level equal to the product of the second duty cycle and maximum voltage of the pulse train output signal.

According to the first aspect of the embodiments, the half-bridge circuit comprises: a first metal oxide semiconductor field effect transistor (MosFet) comprising a first drain connection, a first gate connection, and a first source connection, and wherein the first MosFet is adapted to receive the first receiving circuit output signal at the first gate connection, and is further adapted to be turned on when the first receiving signal is at high logic level voltage, such that a power supply voltage connected to the first drain, which is substantially equal to the maximum voltage, is connected to the first source; a second MosFet comprising a second drain connection, a second gate connection, and a second source connection, and wherein the second drain of the second MosFet is connected to the first source of the first MosFet, and forms the output of the half-bridge circuit, and wherein the second MosFet is adapted to receive the second receiving circuit output signal that is an inverse of the first receiving circuit output signal at the second gate connection, and further wherein the second MosFet is further adapted to be turned on when the second receiving signal is at a high logic level voltage and the first receiving signal is at a low logic level thereby turning off the first MosFet and turning on the second MosFet, such that the half-bridge output is connected to the second source, and wherein the second source is also connected to ground.

According to the first aspect of the embodiments, when the first MosFet is turned on and the second MosFet is turned off, the assembly sources current to the lighting load, and when the first MosFet is turned off and the second MosFet is turned on, the assembly sinks current from the lighting load.

According to the first aspect of the embodiments, the turning on and off of the first and second MosFet transistors generates the pulse train output signal.

According to a second aspect of the embodiments, a method is provided for controlling a lighting load, the method comprising: receiving a pulse width modulated (PWM) control signal with a predetermined duty cycle and frequency; generating complementary gate output signals based on the received PWM control signal; generating a pulse train output signal based on the complementary gate output signals with substantially the same duty cycle and frequency as the received PWM control signal; receiving the generated pulse train output signal at an LC filter; and generating an LC output signal that is substantially equal to the time-averaged product of a maximum voltage of the received pulse train output signal and the duty cycle of the received pulse train output signal, which is also substantially equal to the duty cycle of the PWM input signal.

According to the second aspect of the embodiments, the LC filter has a first cutoff frequency that is about 1/100th of the PWM control signal.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

DETAILED DESCRIPTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as test system, and more particularly to a PWM load controller circuit for controlling a dimmer of a lighting device.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

The different aspects of the embodiments described herein pertain to the context of a systems, methods, and modes for controlling a dimmer of a lighting device using an output of a PWM load controller circuit but is not limited thereto, except as may be set forth expressly in the appended claims.

For 40 years Crestron Electronics Inc., has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes for controlling a dimmer of a lighting device using an output of a PWM load controller circuit, can be used as a load controller for lighting systems as manufactured and sold by Crestron Electronics Inc., located in Rockleigh, N.J.

The following is a list of the elements in the drawings in numerical order.
100 Pulse Width Modulated (PWM) Load Controller Circuit
102 Gate Driver Integrated Circuit
104 Half Bridge Circuit
106 Inductor (L) Capacitor (C) Filter
R108 Input Current Control Resistor
R110 Input Current Control Resistor
Q112 MosFet (Part of Half Bridge Circuit)
Q114 MosFet (Part of Half Bridge Circuit)
L116 Inductor (Part of LC Filter)
C118 Capacitor (Part of LC Filter)
R120 Load Resistance
122 Pulse Width Modulated (PWM) Input Signal
124 Pulse Train (PT) Output Signal
126 Pulse Width LC (PWLC) Output Signal
200 Sink and Source Driver Circuit (Circuit)
R202 Resistor
R204 Resistor
Q206 MosFet in Circuit 200
C208 Capacitor
R210 Pullup Resistor
R212 Pullup Resistor
214 Digital Isolator Integrated Circuit (Dig. Iso. IC)

Figure 1:
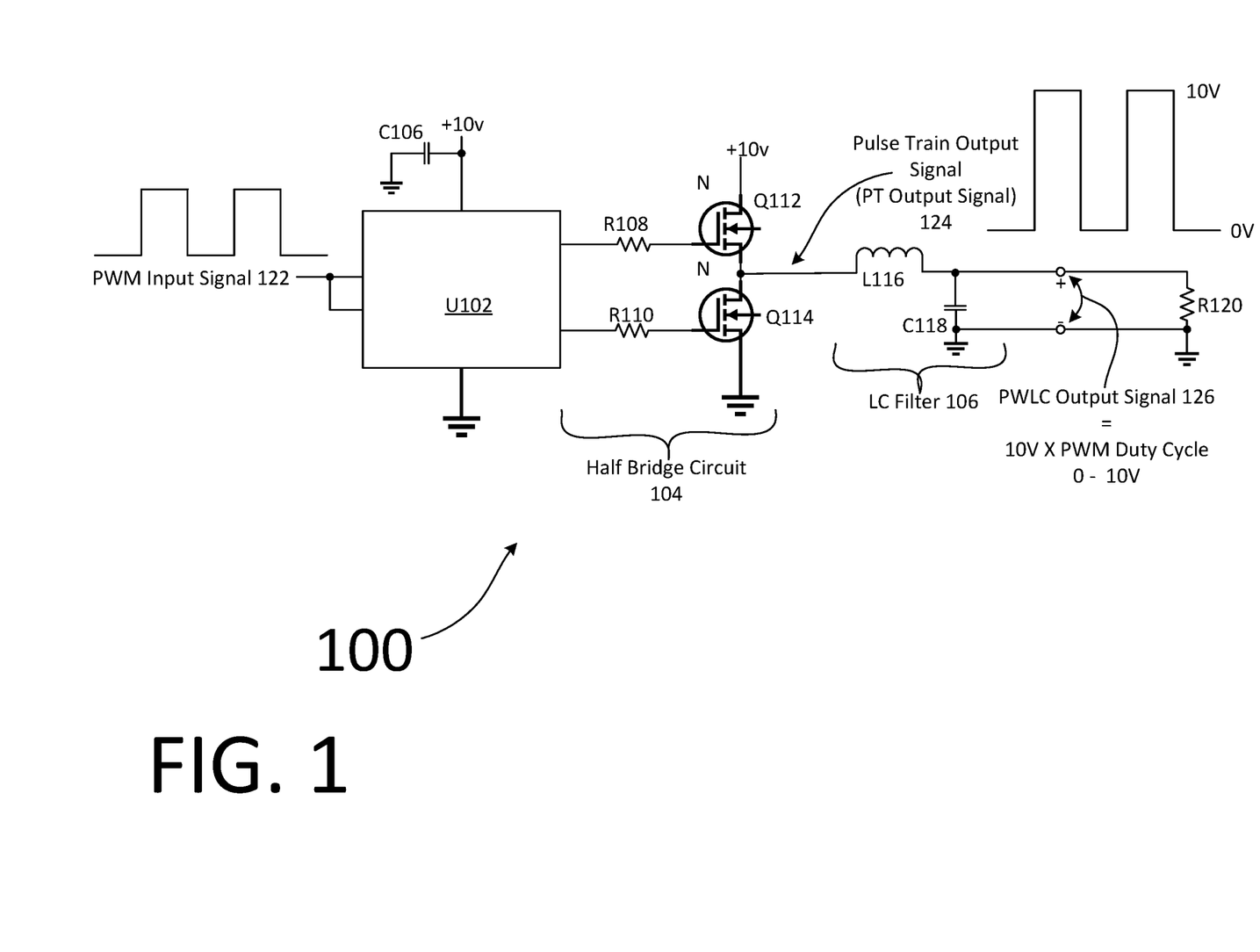
FIG. 1 illustrates a 0-10V pulse width modulator (PWM) load controller circuit according to aspects of the embodiments.

216 Digital Isolator IC Output Signal
218 Inverted Digital Isolator IC Output Signal
220 Gate Driver & Two MosFets IC The following is a list of the acronyms used in the specification in alphabetical order.
C Capacitor
DC Direct Current
GDIC Gate Driver Integrated Circuit
IC Integrated Circuit
IP Input
L Inductor
MosFet Metal Oxide Semiconductor Field Effect Transistor
OP Output
PT Pulse Train
PWLC Pulse Width Inductor Capacitor
PWM Pulse Width Modulator
R Resistor
V Voltage FIG. 1 illustrates 0-10V pulse width modulator (PWM) load controller circuit 100 according to aspects of the embodiments.

According to aspects of the embodiments, PWM load controller circuit 100 is adapted to allow for a direct conversion of a low level PWM signal from a Microcontroller (e.g., microprocessor, processor, or other computer circuit or any other digital control circuit) into a DC output voltage signal that can be used to control output loads of various devices, such as lights.

According to aspects of the embodiments, one function of PWM load controller circuit 100 is to produce a precise direct current (DC) output voltage that is equal to the product of the duty cycle of a PWM signal and the DC supply voltage that powers the circuit. This enables both direct scaling of the desired output voltage, and a precisely controller DC control voltage equal to the duty cycle of the incoming PWM signal multiplied by the DC supply voltage.

In addition, PWM load controller circuit 100 can both "Sink" and "Source" current such that it can operate with both types of Industry Standard Lighting Control schemes (i.e., current sink or current source).

According to further aspects of the embodiments, PWM load controller circuit 100 also eliminates the requirement for positive and negative DC power supplies used by a typical linear amplifiers, and it virtually eliminates the power losses associated with the use of linear amplifiers as well.

PWM load controller circuit 100 as shown in FIG. 1 comprises three main portions, as follows: integrated circuit U102, which, in a non-limiting example is a gate driver integrated circuit (GDIC); a pair of transistors Q112 and Q114 and resistors R108 and R110 that form half-bridge circuit 104, and which, in this non-limiting example, are metal oxide semiconductor field effect transistor (MosFet) switches; and output inductor-capacitor (LC) filter 106 consisting of choke L116 and capacitor C118. Resistor R120 indicates the input impedance of the load PWM load controller circuit 100 is controlling. Resistors R108 and R110 control input current to transistors Q112 and Q 114.

Operation of PWM load controller circuit 100 can be described as follows.

Transistors Q112 and Q114 form Half-Bridge circuit 104, controlled by GDIC U102. GDIC U102 contains level shift and logic circuits for generating high side and low side gate output signals that control the "on" and "off" states of transistors Q112 and Q114 (outputs 1 and 2, respectively). The "on" state of the transistor refers to an operating condition of the transistor in which current can flow between the drain and source terminals of the transistor, as those of skill in the art can appreciate, and the "off" state of the transistor refers to the operating condition of the transistor in which current is substantially prevented from flowing between the drain and source terminals of the transistor. The outputs of GDIC U102 (outputs 1 and 2) form a complimentary signal pair that follows the logic level high and logic level low state of the signal input to GDIC U102, which is labeled PWM input signal 122, at substantially the same frequency of the input signal, PWM input signal 122. That is, according to aspects of the embodiments, the outputs of GDIC U102 are also two digital signals that alternate between high and low logic levels. As those of skill in the art can appreciate, a "low" logic level signal can be defined to be a signal voltage level that is substantially close to zero VDC, or a negative voltage, and a "high" logic level signal can be defined to be a signal voltage level that is some positive voltage e.g., +3.5V, +5V, or +10V, and the like. In addition, the complementary output signals also have a substantially similar frequency and duty cycle as the input drive signal, which is PWM input signal 122. As those of skill in the art can appreciate, complementary means that as a first output becomes a "high" logic level the second output becomes a "low" logic level signal, and then the first and second outputs reverse (second goes high, and first goes low).

According to aspects of the embodiments, in PWM load controller circuit 100, transistor Q112 is on during the high logic level portion of PWM input signal 122, while transistor Q114 is off during this time; then, when PWM input signal 122 goes to a low logic level, transistor Q114 is on and transistor Q112 is off.

The action of turning on transistor Q112 and turning off transistor Q114, and then alternating the on-off states of the transistors Q112, Q114, produces a pulse train output signal from Half-Bridge circuit 104, PT output signal 124, with a peak voltage equal to the DC Power supply voltage (in this case, 10V), and with a duty cycle and frequency substantially equal to that of PWM input signal 122.

The output of half-bridge circuit 104, pulse train output signal PT output signal 124, enters LC filter 106, which consists of inductor (choke) L116 and capacitor C118. LC filter 106 is an averaging filter with a cut-off frequency substantially lower than the frequency of PWM input signal 122, such that the output of LC filter 106 will equal the time-averaged product of its input voltage and the duty cycle of PWM input signal 122. The output of LC filter 106 can be referred to as pulse width LC filter (PWLC) output signal 126. According to aspects of the embodiments, LC filter 106 is a $2^{nd}$ order network filter, with a cutoff frequency equal to about $\frac{1}{100}^{th}$ of the switching frequency (in this non-limiting example, about 100 kHz). Thus, the cutoff frequency would be about 1 kHz, which results in attenuating the 100 kHz fundamental frequency by a factor of 10,000 (or 80 dB). This results in a highly filtered and smooth DC level signal. PWLC output signal 126, at the output of LC filter 106. According to aspects of the embodiments, the cutoff frequency is about 0.01 of the switching frequency (0.01× Switching Frequency), and according to further aspects of the embodiments, the cutoff frequency ranges from about $0.8/100^{th}$ of the switching frequency to about $1.2/100^{th}$ of the switching frequency (i.e., the cutoff frequency ranges from about 0.08% of the switching frequency to about 0.12% of the switching frequency.

By way of non-limiting example, if the maximum voltage of PT output signal 124 is about 10V (because 10 VDC is applied to transistors Q112 and Q114) and the duty cycle is about 30%, then the output of LC filter 106 is:

PWLC signal 126=$10V_{DC} \times 0.3 = 3.0V_{DC}$

As can now be appreciated by those of skill in the art through the discussion herein, substantially precise control of the output voltage can be obtained by controlling the duty cycle of the input signal, PWM_Input signal 122, and it is further known that the duty cycle of digital signals can be controlled substantially precisely, as such aspects of a digital signal can be controlled through the use of digital circuits.

By way of a second non-limiting example, if the maximum voltage of PT output 124 is about 10V and the duty cycle is about 80%, then the output of the LC filter is:

PWLC signal 126=$10V_{DC} \times 0.8 = 8.0V_{DC}$

By way of a third non-limiting example, if the maximum voltage of PT output 124 is about 10V and the duty cycle set to be about 0%, then the output of the LC filter is:

PWLC signal 126=$10V_{DC} \times 0.0 = 0.0V_{DC}$

In this third non-limiting example, the input signal, PWM input signal 122, is in a continuous logic voltage low state that will keep transistor Q112 off while transistor Q114 will be maintained on.

According to aspects of the embodiments, this "switched mode" operation enables PWM load controller circuit 100 to "source current" into a load that's connected to circuit ground (i.e., current flows from the +10V power supply through transistor Q112 and inductor L116 into the load (R120)), as well as being able to "sink current" from the load that's connected to an external DC voltage referenced to ground (i.e., current flows from the load connected to the through inductor L116 and transistor Q114).

As those of skill in the art can appreciate, these two types of load configurations, sinking and sourcing current, represent both industry standard lighting control loads in current use.

According to aspects of the embodiments, there are several advantages and benefits to the use of PWM load controller circuit 100 as described herein, especially when compared to conventional linear amplifiers, a partial list of which is shown below:

Sink & Source capability using a single positive Power Supply voltage (i.e., no need for negative supply);
Direct conversion from PWM input to DC output voltage, equal to accuracy of Digital PWM signal;
Extremely high efficiency due to switched-mode operation (described in detail below);
Reduced component count resulting in overall cost savings;
No signal scaling required between PWM input signal and 0-10V output signal; and
Substantially little or no thermal drift to temperature changes, which are normally seen in linear amplifier circuits.

As mentioned above, use of PWM load controller circuit 100 provides increased efficiencies over that of a linear amplifier. The following is a non-limiting description and example of how such efficiency can be illustrated.

The high efficiency results from the switched-mode operation of Q1 and Q2, such that they are fully on when conducting of the load current, with virtually zero volts across them. The following example can be used to illustrate this.

$V_{In}$ is the input DC voltage feeding transistors Q112 and Q114 of Half-Bridge circuit 104, and is set to 10V;
$V_{Out}$ is the desired DC output voltage (PWLC output signal 126), set to 5V;
D is the duty cycle of the signal output from Q112 and Q114, and is set to 0.5; therefore, Vout (PW_Output signal 126)=Vin×D; =10V×0.5=5V;
R120 is the resistance of output load, set to 100Ω;
$R_{DS}$ is the drain-source resistance of Q112 and Q114, and is set to 100 mΩ in this example;
$I_{Out}$ is the output current;
$P_{Out}$ is the power delivered to the output load;
$P_{DS}$ is the power loss in each of Q112 and Q114;
$P_{In}$ is the input power delivered to transistors Q112 and Q114 of Half-Bridge circuit 104, and is equal to $P_{Out}+P_{DS}$; and
$E_{FF}$ is the Efficiency.

The pertinent calculations for PWM load controller circuit 100, as those of skill in the art can appreciate, are as follows:

$I_{Out}=V_{Out} \div R_{Out}; I_{Out}=5V \div 100\Omega = 50$ mA $P_{Out}=(I_{Out})^2 \times (R_{Out}); P_{Out}=(50$ mA$)^2 \times (100\Omega)=250$ mW $P_{DS}=(I_{Out})^2 \times (R_{DS}) \times (D); P_{DS}=(50$ mA$)^2 \times (100$ mΩ$) \times (0.5)=0.125$ mW $P_{In}=P_{Out}+P_{DS}+P_{DS}; P_{In}=250$ mW+0.125 mW+0.125 mW=250.25 mW $E_{FF}=(P_{Out} \div P_{In}) \times 100\%; E_{FF}=(250$ mW÷250.25 mW$) \times 100\%=99.9\%$.

By contrast, a linear mode of operation is extremely inefficient since Q112 and Q114 would each function as a controlled resistor in the load current path, resulting in a substantial voltage across them while conducting. This causes a significant power loss in Q112 and Q114 resulting in a degraded operating efficiency.

Using the exact same operating parameters in the example above, the following illustrates the efficiency using a linear mode of operation.

$V_{DS}$ is the voltage between the drain and source of transistor Q112, and which is equal to: Vin−Vout (or $V_{DC}$−PW_Output signal 126);
$P_{Out}$ is the power delivered to the output load, equal to 250 mW;
$P_{In}$ is the input power delivered to transistor Q112, equal to: $P_{Out}+P_{DS}$; and;
$P_{DS}$ is the power loss in transistor Q112 as this is the only MosFet transistor conducting, and is equal to: $V_{DS} \times I_{Out}$.

The pertinent calculations for a linear amplifier, as those of skill in the art can appreciate, are as follows:

$V_{DS}=V_{In}-V_{Out}; V_{DS}=10V-5V=5V$ $P_{DS}=V_{DS} \times I_{Out}; P_{DS}=(5V) \times (50$ mA$)=250$ mW $E_{FF}=(P_{Out} \div P_{In}) \times 100\%; E_{FF}=(250$ mW$) \div (250$ mW+250 mW$)=50\%$ The above list of advantages and benefits in regard to PWM load controller circuit 100 is not meant to be, and should not be construed to be, an exhaustive or limiting list of benefits and/or advantages.

Figure 2:
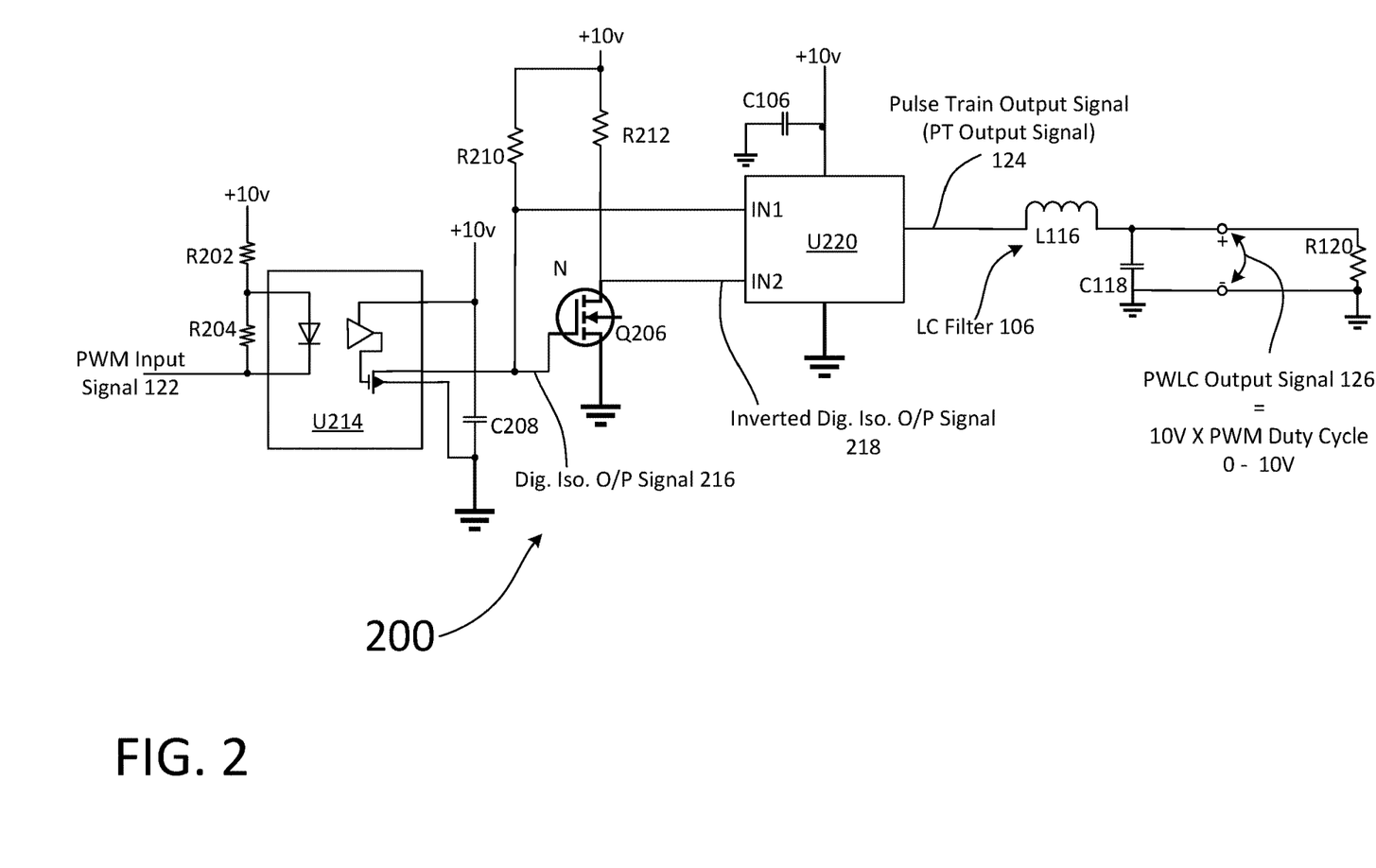
FIG. 2 illustrates a 0-10 volt sink and source driver circuit that uses the PWM load controller circuit of FIG. 1 according to aspects of the embodiments.

FIG. 2 illustrates a 0-10 volt, sink and source driver circuit 200 that uses PWM load controller circuit 100 of FIG. 1 according to aspects of the embodiments.

Attention is now directed to FIG. 2 and circuit 200. In circuit 200, digital isolator U214 converts a 3.3V level PWM input signal (e.g., PWM input signal 122) to an isolated 10V level output signal, Dig. Iso O/P signal 216, with a substantially similar frequency and duty cycle as the input 3.3V level signal. According to aspects of the embodiments, R202 limits the level of forward current thru the input diode of U214, and resistor R204 provides a path for the leakage current associated with the input diode of U214.

The 3.3V input signal, PWM input signal 122, is typically about 100 kHz and can be generated by a microcontroller or other type digital circuit. According to aspects of the embodiments, while PWM input signal 122 can be virtually any frequency, those of skill in the art can appreciate that 100 kHz allows for smaller size components for L116 and C118.

Figure 3:
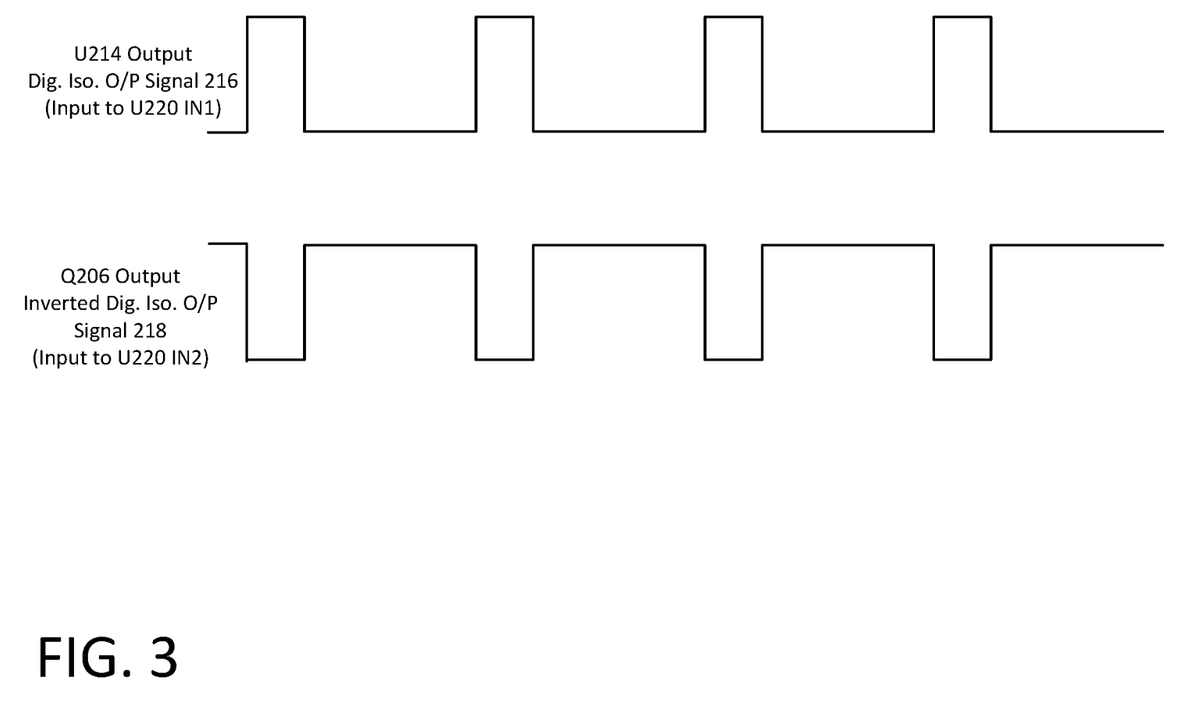
FIG. 3 illustrates an output of a MosFet transistor as shown in FIG. 2 that inverts an output of an integrated circuit shown in FIG. 2, thereby generating a complimentary 10V PWM signal at a substantially similar frequency, but with a duty cycle that is inverted from that of the PWM signal input to the MosFet according to aspects of the embodiments.

MosFet Q206 inverts the signal output from digital isolator integrated circuit U214 (U214), digital isolator output signal (Dig. Iso O/P signal) 216, and generates a complimentary 10V PWM signal at a substantially similar 100 KHz frequency, but with a duty cycle that is inverted from that of the PWM signal, and which is shown in FIG. 3. The inverted output of Q206 is referred to as inverted Dig. Iso O/P signal 218.

Integrated circuit U220, which, according to a non-limiting example can be part number MP6513 made by Monolithic Power Systems in this example, contains two power MosFets configured in a Half-Bridge circuit configuration as well as the gate driver U102 of FIG. 1, according to aspects of the embodiments.

U220 has two input channels, IN1 and IN2, such that IN1 controls its Hi-side MosFet while IN2 controls its Low-side MosFet. The control scheme of U220 is such that the on and off duration of its power MosFets follows the logic state of the IN1 and IN2 input signals. According to aspects of the embodiments, U102 in FIG. 1 illustrates a Gate Driver that is used to drive external MosFets Q112 and Q114, while in FIG. 2, U102 is a part that combines the Gate Driver and MosFets Q112 and Q114, while also requiring both non-inverted and inverted inputs IN1 and IN2, in integrated circuit U220.

The circuit shown in FIG. 2 enables the generation of a 10V PWM signal (PT output signal 124) that is input to LC filter 106 consisting of L116 and C118. LC filter 106 averages the 100 kHz PWM output signal of U102 (PT output signal 124) in a substantially similar manner as described above in regard to FIG. 1, providing a DC output voltage at a level that is proportional to the duty cycle of the original 3.3V input signal (PWM input signal 122). By controlling and setting the duty cycle of the original 3.3V PWM signal, the DC output voltage at the output of LC filter 106 can be varied over the complete 0-10V range, as described above.

The Half-Bridge configuration of integrated circuit U102 of FIG. 2 provides a 2-Quadrant operating mode according to aspects of the embodiments, such that the 0-10V circuit technique can either sink or source current, accommodating both types of 0-10V controllable lighting fixtures.

The 0-10V output of both circuits of FIGS. 1 and 2 are connected to a control circuit, which is normally part of a controllable ballast/light emitting diode (LED) driver, among other types of control circuits.

Figure 4:
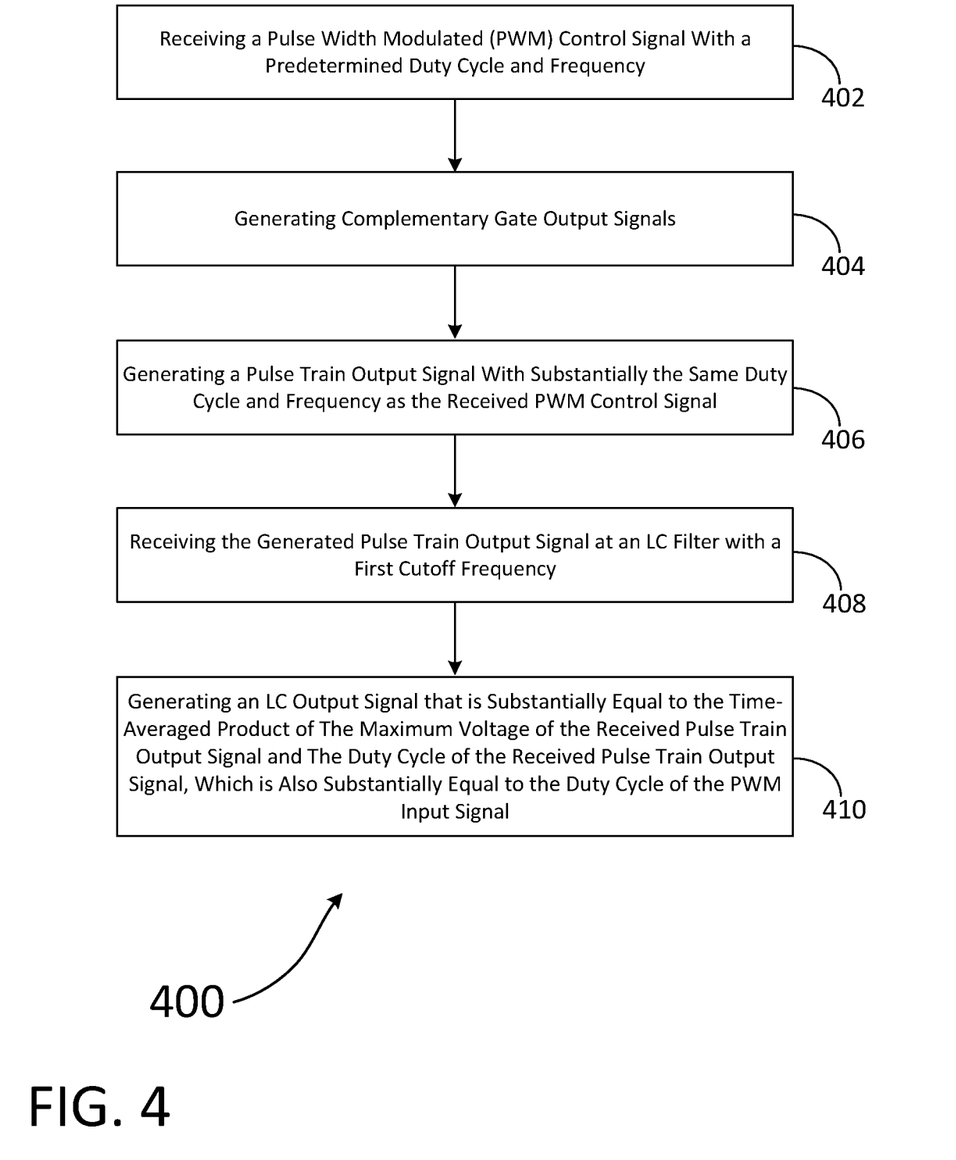
FIG. 4 illustrates a method for generating a pulse width modulated load control signal by a circuit that can both sink and source current according to an aspect of the embodiments.

FIG. 4 illustrates method 400 for generating a pulse width modulated load control signal by a circuit that can both sink and source current (method 400) according to an aspect of the embodiments.

Method 400 begins with method step 402, in which PWM input signal 122 with a predetermined duty cycle and frequency is received by PWM load controller circuit 100, and more specifically by U102.

In method step 404, U214 and Q206 shown in FIG. 2 generate complementary gate output signals that are input, respectively, to IN1 and IN2 of U102. The complementary gate output signals have substantially the same frequency as the received PWM input signal 122, but one gate output signal has substantially the same duty cycle as PWM input signal 122, and the other has substantially inverse duty cycle as PWM input signal 122.

In method step 406, U102 shown in FIG. 2 that contains the half bridge circuit 104 illustrated in FIG. 1, receives the complementary gate output signals generated by U214 and Q206. The half bridge circuit within U220 generates PT output signal 124, which has a substantially similar duty cycle and frequency as PWM input signal 122, but with a different maximum voltage, in this non-limiting example about 10V, as that is the voltage source tied to half bridge circuit 104 according to aspects of the embodiments.

In method step 408, generated PT output signal 124 is received by LC filter 106, which is an averaging filter with a cut-off frequency substantially lower than the frequency of PT output signal 124 (and PWM input signal 122, because they are substantially similar).

In method step 410, LC filter 106 generates an output signal, PWLC output signal 126, which is a DC voltage signal equal to the product of the duty cycle of the received PT output signal 124 and the maximum voltage of the received PT output signal 124, as described above.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The disclosed embodiments provide systems, methods, and modes for controlling a dimmer of a lighting device using an output of a PWM load controller circuit. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

Industrial Applicability

To solve the aforementioned problems, the aspects of the embodiments are directed towards systems, methods, and modes for controlling a dimmer of a lighting device using a 0-10V output of a PWM.

Alternate Embodiments

Alternate embodiments may be devised without departing from the spirit or the scope of the different aspects of the embodiments.

What is claimed is:

1. A lighting load control assembly, comprising:
   a circuit adapted to source a first lighting load controlling current to a lighting load and sink a second lighting load controlling current from the lighting load through a single common circuit element, wherein the circuit comprises:
   a signal receiving device adapted to receive a lighting load controlling signal, the lighting load controlling signal comprising a first fixed frequency and first fixed duty cycle, and wherein
      the signal receiving device is further adapted to generate a first and second receiving circuit output signal, each of which has substantially similar frequency as the received lighting load controlling signal, but wherein the first and second receiving circuit output signals have complementary duty cycles;
   a half-bridge circuit adapted to receive the first and second receiving circuit output signals and generate a pulse train output signal, wherein
      the pulse train output signal comprises a second duty cycle substantially similar to the first fixed duty cycle of the lighting load controlling signal, and wherein
      the pulse train output signal further comprises a maximum voltage and still further comprises a second frequency substantially similar to the first fixed frequency of the lighting load controlling signal; and
   an LC filter adapted to receive the pulse train output signal, and generate a direct current output voltage signal with a voltage level equal to the product of the second duty cycle and maximum voltage of the pulse train output signal.

2. The assembly according to claim 1, wherein the single common circuit element comprises:
   an inductor that is part of a passive low pass inductor capacitor filter.

3. The assembly according to claim 2, wherein the low-pass inductor capacitor filter is adapted to generate a time-averaged direct current output voltage substantially equal to a product of a maximum voltage of a signal input to the low-pass inductor capacitor filter and a duty cycle of the signal input to the low-pass inductor capacitor filter.

4. The assembly according to claim 3, wherein the low-pass inductor capacitor filter is further adapted to have a cut-off frequency that is about $1/100^{th}$ of a frequency of the signal input to the low-pass inductor capacitor filter.

5. The assembly according to claim 1, wherein the half-bridge circuit comprises:
   a first metal oxide semiconductor field effect transistor (MosFet) comprising a first drain connection, a first gate connection, and a first source connection, and wherein
      the first MosFet is adapted to receive the first receiving circuit output signal at the first gate connection,
      and is further adapted to be turned on when the first receiving signal is at high logic level voltage, such that a power supply voltage connected to the first drain, which is substantially equal to the maximum voltage, is connected to the first source;
   a second MosFet comprising a second drain connection, a second gate connection, and a second source connection, and wherein the second drain of the second MosFet is connected to the first source of the first MosFet, and forms the output of the half-bridge circuit, and wherein
      the second MosFet is adapted to receive the second receiving circuit output signal that is an inverse of the first receiving circuit output signal at the second gate connection, and further wherein
      the second MosFet is further adapted to be turned on when the second receiving signal is at a high logic level voltage and the first receiving signal is at a low logic level thereby turning off the first MosFet and turning on the second MosFet, such that the half-bridge output is connected to the second source, and wherein the second source is also connected to ground.

6. The assembly according to claim 5, wherein
   when the first MosFet is turned on and the second MosFet is turned off, the assembly sources current to the lighting load, and
   when the first MosFet is turned off and the second MosFet is turned on, the assembly sinks current from the lighting load.

7. The assembly according to claim 5, wherein
   the turning on and off of the first and second MosFet transistors generates the pulse train output signal.

8. A method for controlling a lighting load, the method comprising:
   receiving a pulse width modulated (PWM) control signal with a predetermined duty cycle and frequency;
   generating complementary gate output signals based on the received PWM control signal;
   generating a pulse train output signal based on the complementary gate output signals with substantially the same duty cycle and frequency as the received PWM control signal;
   receiving the generated pulse train output signal at an LC filter;
   and generating an LC output signal that is substantially equal to the time-averaged product of a maximum voltage of the received pulse train output signal and the duty cycle of the received pulse train output signal, which is also substantially equal to the duty cycle of the PWM input signal.

9. The method according to claim 8, wherein the LC filter has a first cutoff frequency that is about $\frac{1}{100}^{th}$ of the PWM control signal.

\* \* \* \* \*